Nov. 24, 1931.  A. L. KIMBALL  1,833,751
VIBRATION DAMPING DEVICE
Filed July 5, 1929
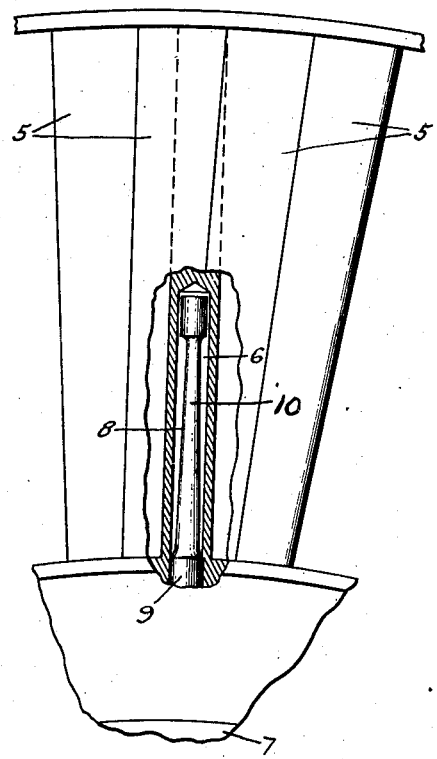
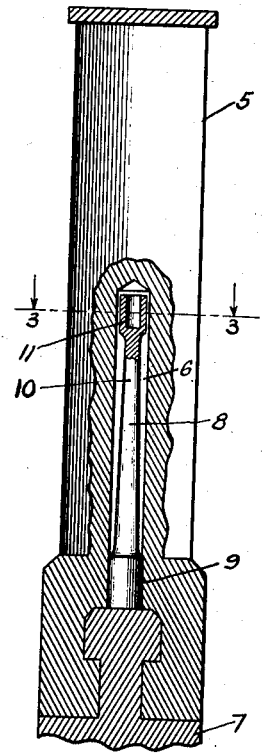
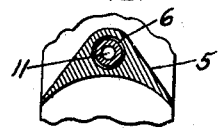
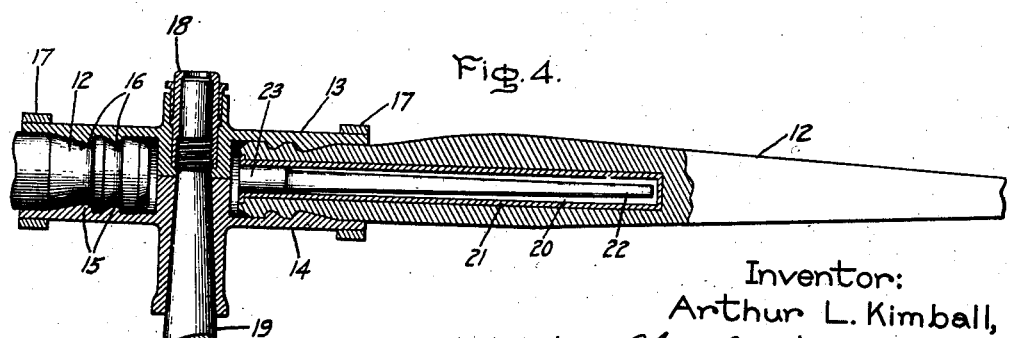
Inventor:
Arthur L. Kimball,
by Charles E. Tullar
His Attorney.

Patented Nov. 24, 1931

1,833,751

UNITED STATES PATENT OFFICE

ARTHUR L. KIMBALL, OF SCHENECTADY, NEW YORK, ASSIGNOR TO GENERAL ELECTRIC COMPANY, A CORPORATION OF NEW YORK

VIBRATION DAMPING DEVICE

Application filed July 5, 1929. Serial No. 376,264.

The present invention relates to vibration bodies, particularly elongated bodies rigidly fixed at one end to a support and subject at the other end to vibrations of a destructive character, such as those having a relatively low frequency and large amplitude.

The invention is particularly well adapted to turbine blades, aeroplane propellers, and the like, and in the accompanying drawings I have shown it applied to such apparatus but it will be understood that the invention is not necessarily limited thereto.

Considerable difficulty has been experienced with the blades of a turbine rotor and also with aeroplane propellers breaking under continued vibrations caused by uneven application of load and actuating forces, governing, end thrust of shaft, unbalanced forces and the like.

The turbine and propeller blades which are fixed at one end to their supports vibrate as a reed or cantilever. Continued vibration causes fatigue failure and subsequent breakage of the blades.

According to my invention I provide a cavity in a body such as a propeller or turbine blade and dispose in such cavity a member which is rigidly fixed to the support and which is designed to have a higher natural frequency of vibration than the body, i. e., the member is made stiffer or more resistant to deflections than the body for example, by reason of its being of less length than the body. The clearance space between the member and body is filled with a fluid, which fluid in conjunction with the rigid member increases the internal resistance to deflection of the assembly. I find mercury is very effective due to the fact that impressed vibrations must move the viscous fluid in the cavity from one side of the member to the other. It has been determined by experiment that the fluid and inside member reduce the amplitude of the vibrations of the body to a very small amount. For example, a 20" body fixedly mounted at its inner end on a shaft driven by a motor, said shaft having an eccentric loading to cause vibrations showed an $\frac{11}{32}''$ deflection at the outer end of the body without the viscous fluid and a 2/32" deflection with the viscous fluid when the body is caused to vibrate at its critical frequency.

In order that this invention may be more fully understood reference may be had to the accompanying drawings in which:

Fig. 1 is a fragmentary side elevation with parts broken away and in section of my invention applied to a turbine;

Fig. 2 is an end view of the parts shown in Fig. 1;

Fig. 3 is a sectional view on line 3—3, Fig. 2; and

Fig. 4 is a central sectional view of a modification of my invention applied to an aeroplane propeller, certain parts being shown in elevation.

In carrying out my invention as applied to turbine blades, attention is directed to Figs. 1, 2 and 3, in which the turbine blades 5 having cavities 6 are rigidly fixed to a rotor disk 7. An inside member or rod 8 is disposed in each cavity and rigidly mounted relative to the support 7. The member 8 is designed to have a higher natural frequency of vibration than the blade 5 as explained above. Cavities and inside members may be provided for all or selected blades. The base portion 9 of member 8 makes a drive or other tight fit with the turbine blade base. The remaining portion of the member 8 may be straight or preferably tapered as shown at 10 to cut down the mass of the member, to increase its natural frequency of vibration and to afford a fluid space in the cavity 6. The space in the cavity 6 not occupied by the inside member 8 is filled with a fluid such as cylinder oil. Other fluids may be employed. Mercury has proved very effective though its viscosity is relatively low. If desired, the free end of the member 8 may be enlarged and hollowed out as shown at 11 to increase the surface area of the tip without increasing its weight. The increased area of the tip affords additional resistance to the flow of fluid from one side of member 8 to the other. Forced vibrations of body 5 which would tend to vibrate with a large amplitude are resisted by the inside member 8 and by the resistance that the fluid offers when caused to flow from side to side of the member 8. This resistance cuts down or damps the amplitude of vibrations of the body 5, thus eliminating excessive or destructive vibrations of the same. The inside member damps all vibrations which act at substantially right angles to the blade.

In Fig. 4 my invention is disclosed as applied to an aeroplane propeller blade. It is shown applied to a detachable blade type propelled since it may be conveniently adapted to this construction. It is obvious that with an integral type propeller the damping device would have to be applied at an angle to the longitudinal axis of the blade. Fig. 4 illustrates an aeroplane propeller assembly having blades 12 retained in a split hub comprising hub halves 13 and 14 which are provided with annular ridge 15. Blades 12 have corresponding grooves 16 which cooperate with ridges 15 to retain the blades 12 against centrifugal displacement when the halves 13 and 14 are clamped by tightening rings 17 and a retaining nut 18 screw threaded to shaft 19.

A cavity 20 is formed in blade 12 or, if a hollow blade is to be employed, holes are formed through spacer blocks contained therein and a tube 21 closed at its inner end is rigidly fixed relative to its blade through said spacer blocks (not shown). A member 22 has a cylindrical end portion 23 which makes a drive or other tight fit with the tube 21 for rigidly fixing one end of member 22 relative to blade 12. The member 22 tapers toward its free end and may or may not be provided with the enlarged hollow tip as shown at 11 in Figs. 1 to 3 inclusive. The tube 21 is constructed of metal or other rigid material impervious to fluid and used as a container for oil or other suitable fluid, which surrounds member 22. In the case of a duralumin or other solid metal propeller the tube may be omitted, as in the case of the turbine blade but in a wood propeller it would prevent the fluid from penetrating the wood fibers and in a hollow metal propeller would afford a chamber of a suitable section similar to that of the stiffener member.

The tube 21 is filled by the member 22 and a viscous fluid. Member 22 and the fluid have the same damping action on forced vibrations of the blades as that described with reference to the Figs. 1 to 3 inclusive.

It is obvious that many modifications and structural variations may be resorted to utilizing this invention and it is understood that in the appended claims I aim to cover all such modifications as fall within the true spirit of my invention.

What I claim as new and desire to secure by Letters Patent of the United States, is:

1. The combination with an elongated body having a longitudinally disposed cavity and a support on which one end of said body is rigidly fixed, of a member having a higher natural frequency of vibration than said body, one end of the member being rigidly fixed relative to said support, said member projecting into the cavity in said body and a liquid in said cavity.

2. The combination with an elongated body rigidly mounted at one end to a support, and containing a cavity, of a rigidly supported member which has a higher natural frequency of vibration than the body and projects into the cavity in said body, and a viscous fluid disposed in said cavity and surrounding the member.

3. In combination, a rotor, radially disposed elongated bodies which are rigidly fixed at one end to said rotor and have elongated cavities which extend radially from said fixed end into the bodies, and radially disposed rods which are rigidly fixed at one of their ends relative to the rotor and project into said cavities, said rods having higher natural frequencies of vibration than said bodies and a liquid disposed in said cavities.

4. In an elastic fluid turbine, a rotor, radially extending blades rigidly fixed at their bases to said rotor and having cavities extending radially outwardly into said blades from their bases, radially disposed members each having one end rigidly fixed relative to said rotor projecting into the cavities and a fluid in said cavities.

5. An elongated body, a support to which one end of said body is rigidly fixed, a member having a higher natural frequency of vibration than said body, one end of said member being rigidly fixed relative to said support, said member projecting into a longitudinally disposed cavity in said body and surrounded by a fluid contained in said cavity, said member being tapered inwardly from its fixed end to an enlarged and hollowed tip at its free end.

6. A body which is subjected to vibration having a longitudinally extending cavity at its inner end, a rotary support to which the body is secured at its inner end, a member which is also mounted on the support at its inner end, and has a different natural frequency of vibration than the body, and which extends lengthwise of the cavity and is separated from the wall thereof by a small clearance, and a fluid in the cavity which fills the clearance, said member and fluid acting as a damping means for the body.

7. A body which when rotated is subjected to vibration at its outer end and which is provided with a longitudinally extending cavity at its inner end, a rotary support to which the body is secured at its inner end, a member which is also mounted on the support at its inner end, and has a higher natural frequency of vibration than the body, and which extends into the cavity and has its outer end enlarged to increase its surface area, and a body of fluid which fills the space in the cavity between the member and its walls to damp vibrations.

8. In a rotating blade having a cavity extending longitudinally thereof, means for damping the vibrations of the blade comprising a rigidly supported means in said cavity and a cushioning element disposed in said cavity and engaging said rigidly supported means.

9. The combination with a rotating blade having a cavity therein, of means for damping the vibrations of said blade comprising a rigidly supported rod extending into said cavity and a liquid disposed between said rigidly supported rod and the walls of the cavity.

10. The combination with a support and an elongated member fastened to the support, of a rigidly supported vibration dampening member and a fluid of high viscosity and great specific weight provided in a cavity of the elongated member whereby said dampening member causes displacement of fluid in said cavity in different directions and thereby dampens oscillatory energy of said elongated member.

In witness whereof, I have hereunto set my hand this 3rd day of July, 1929.

ARTHUR L. KIMBALL.